Sept. 30, 1958    H. TE GUDE    2,854,628
ARRANGEMENT FOR IMPROVING THE INDICATING SENSITIVITY
OF MEASURING OR INDICATING DEVICES
Filed Jan. 21, 1953
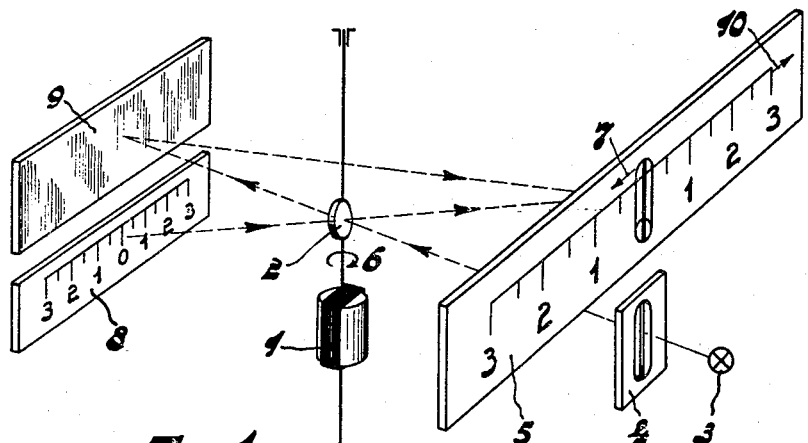
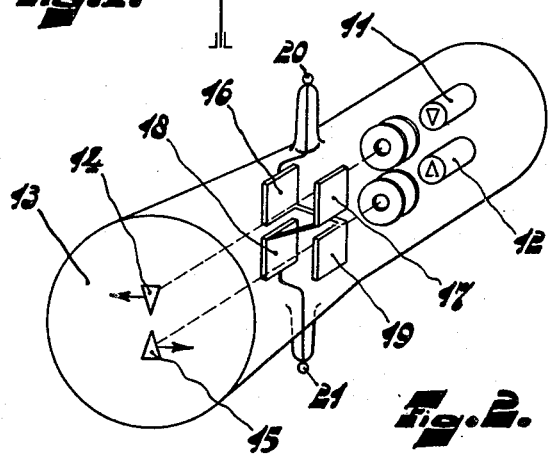
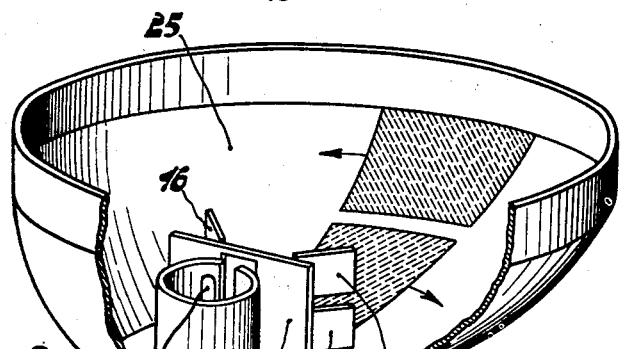
INVENTOR.
HELMUTH TE GUDE
BY
AGENT

United States Patent Office 2,854,628
Patented Sept. 30, 1958

2,854,628

ARRANGEMENT FOR IMPROVING THE INDICATING SENSITIVITY OF MEASURING OR INDICATING DEVICES

Helmuth te Gude, Hamburg-Lockstedt, Germany, assignor, by mesne assignments, to North American Philips Company, Inc., New York, N. Y., a corporation of Delaware Application January 21, 1953, Serial No. 332,208

Claims priority, application Germany May 2, 1952

1 Claim. (Cl. 324—97)

The invention relates to an arrangement operative to improve the indicating sensitivity of measuring or indicating devices comprising an indicating pointer without mass which is capable of moving over a graduated scale or relatively to a point of reference (zero point). The arrangement may be used with a mirror galvanometer, the beam of which moves over a scale or is adapted to subjective deflection. As an alternative field of application of the invention I may mention cathode-ray tubes which are used as voltage indicators or voltmeters, the cathode beam fulfilling the function of the pointer without mass.

It is common knowledge that with mirror galvanometers the use of mirror reading doubles the indicating sensitivity since the angle of deflection of the light-beam is twice that of the measuring instrument or of the mirror associated therewith respectively.

In such mirror galvanometers as well as in cathode-ray tubes for use as potential indicators the pointer moves over a stationary scale. The invention is based on the recognition of the fact that the indicating sensitivity may be considerably increased, for example doubled, if the scale is acted upon by the quantity to be measured so as to move in a direction opposite to that of the pointer. In measuring devices comprising pointers without mass this is possible without additional load being imposed on the measuring instrument and the deflecting sensitivity being thus increased.

Accordingly the invention is characterized in that the quantity required to be measured or indicated acts both upon the pointer and although in the opposite direction, upon the scale or point of reference respectively which is also substantially devoid of mass.

If only a zero indication is concerned the scale is substituted by a point of reference with which the position of the indicating beam proper is compared. Obviously, such a reference point may be caused to be acted upon by a quantity to be measured as readily as the indicating beam and in this case the only thing required is to ensure movement of the two points in opposite directions.

However, when the invention is applied to a moving coil system for measuring electric quantities, there is no need to use two such systems, one of which acts upon the indicating beam, whereas the other acts upon the reference point. The arrangement may be such that projected on to a graduated surface or observed subjectively through the rotary mirror are both an indicating point directly and a reference or zero point indirectly, that is to say via the device which reverses the direction of movement, for example a stationary mirror. The use of a single indicating system thus permits of moving in opposite directions the two indicating images required to be compared and thus of doubling the indicating sensitivity.

As an alternative, a device according to the invention may be designed so as to make provision in a cathode-ray tube for two parallel electron beams, one of which produces the measuring point on the fluorescent screen, whereas the other produces the reference point or several scale points, the two beams being deflected in opposite directions by the same quantity to be measured. We are here concerned with the electric analogon of the above described mechanico-optical device, the two cathode beams replacing the luminous indicating pointer. It is thus ensured in a simplified manner, that is to say electrically, that the two spots of light are caused to move in opposite directions under the action of the quantity required to be measured.

The invention will now be described with reference to the accompanying drawing, in which three embodiments are shown by way of example, and in which:

Fig. 1 shows an arrangement according to the invention as used for a moving coil system;

Fig. 2 shows a cathode-ray tube according to the invention for use as a potential indicator;

Fig. 3 shows, partially broken away, the system of a tuning indicator tube according to the invention.

Referring now to Fig. 1, a moving coil system 1 shown diagrammatically supports a rotary mirror 2 which is silver-plated on both sides. The indicating beam is produced in a manner known per se in that an incandescent lamp 3 illuminates a slit diaphragm 4 which is covered by a thread and is projected on to a ground glass plate 5 through the mirror 2 by means of a lens system. The path of the beam is indicated in the drawing by a dot-dash line. On rotation of the moving coil or rotary mirror 2 respectively in the direction indicated by the arrow 6, the image of the thread-covered slit 4 travels over the ground glass plate 5 in the direction indicated by the arrow 7.

In addition arranged behind the moving coil 1 is a scale 8 which is illuminated in a non-specified manner. Arranged over the scale 8 is a stationary reversing mirror 9. Through the rotary mirror 2 and the reversing mirror 9 the illuminated scale 8 is projected on to the ground glass plate 5, on which in the neutral position of the measuring system it forms an image of itself approximately as shown. This path of the rays is indicated by broken lines. The optical system required to obtain a distinct image and constituted by lenses or the like is omitted for the sake of simplicity, since it is not essential for an understanding of the invention. On rotation of the mirror 2 in the direction indicated by the arrow 6, the reversing mirror 9 causes the projection of the scale 8 on the ground glass plate 5 to move in accordance therewith in a horizontal direction, this direction being indicated by the arrow 10.

Deflection of the moving coil 1 consequently causes the image of the threaded slit to shift to the left and the image of the scale to shift to the right on the ground glass plate 5, that is to say in opposite directions.

Assuming the two indicating beams to be equal in length, the indicating sensitivity is doubled compared with a similar arrangement which comprises a stationary scale. However, in the arrangement shown, one of the indicating beams shown is longer than the other indicating beam, so that the indicating sensitivity is even increased. There is no objection to projecting the threaded slit 4 instead of the reversing mirror 9. This has not the effect of changing the indicating sensitivity but may ensure in practice better readibility in some cases, since the speed of movement of the scale and of the numerals thereon is less than that of the reading point.

Fig. 2 shows diagrammatically a cathode-ray tube according to the invention which serves to indicate that a voltage is zero. It comprises two systems 11 and 12, each generating a beam. The arrangement is such that either beam is triangular in cross-section, so that two triangular spots of light 14 and 15 are produced on the fluorescent screen 13 of the tube. Two pairs of deflector plates 16, 17 and 18, 19 respectively are provided for the deflection of the two beams, the deflector plates being interconnected crosswise in the manner shown. The voltage required to be measured is applied to the input terminal 20, 21.

When the input terminal 20 and hence the deflector plates 16 and 19 are thus charged positively and the input terminal 21 together with the deflector plates 17 and 18 negatively, the two light spots 14 and 15 are deflected in opposite directions, as indicated by the arrows. Zero potential is distinguished in that the two light spots register exactly, and it will be obvious that when a finite measuring potential is applied, the resulting deflection of the light spots measured from spot to spot is twice as great as would be the case, if, other things being equal, only one spot of light were provided and compared with a stationary zero point.

A tuning indicator tube which is based on the principal of the invention, is shown in Fig. 3. The system of this tube, which is shown broken away in part, comprises a cathode 22 for the production of an approximately tape-like electron beam, the cathode being surrounded by a longitudinally slitted cylinder 23 which has cathode potential applied to it. A suction electrode 24, which is slitted to allow the passage of the electron beam, is arranged in front of the slit of the said cylinder. Finally provision is made for deflector plates 16, 17, 18 and 19 of which the plate 18 is not shown for the sake of clarity. These two pairs of deflector plates are exactly similar to those of Fig. 2 and are therefore designated by the same reference numerals. They are interconnected crosswise in a similar manner as in the case of Fig. 2 and act to deflect the electron beam, which is split up into an upper and a lower half. The electrons strike a funnel-shaped fluorescent screen 25. This screen has anode potential applied to it, is coated internally with a suitable fluorescent material and can be observed from above in the usual manner. If the measuring potential applied to the pairs of deflector plates is zero, two fluorescent spots shown shaded in broken lines are produced. These spots are deflected in the directions indicated by the arrows and hence in opposite directions if the potential applied to the pairs of deflector plates differs from zero.

The tuning indicator tube shown in Fig. 3 may be used advantageously in the bridge arm of a measuring bridge circuit arrangement, if the problem in operating the bridge is to indicate the moment at which the bridge potential passes through zero. As an alternative it may be used for the tuning indication of frequency modulated wireless receivers, since the known symmetrical ratio-detector circuit arrangements produce a control voltage which passes through zero and zero position is characteristic of accurate tuning.

What I claim is:

A device for improving the sensitivity of measuring or indicating instruments comprising a pointer in the form of a projected beam generated by an electrical source, a scale also being in the form of a projected beam generated by an electrical source, said pointer being movable relatively to said scale upon change of electrical conditions in said device, deflecting means in said device responsive to said changes of electrical conditions in said device for moving said pointer relatively to said scale, said deflecting means including a rotatable mirror thereon and plated on both sides, a transparent scale and a stationary mirror mounted on one side of said rotatable mirror and a transparent screen mounted on the other side of said rotatable mirror, said scale beam being deflected from one side of said mirror to said stationary mirror and thence to said transparent screen, and said pointer beam being deflected from the other side of said rotatable mirror to said transparent screen.

References Cited in the file of this patent

UNITED STATES PATENTS

| | | |
|---|---|---|
| 1,275,786 | Stuart | Aug. 13, 1918 |
| 2,150,398 | Paulson | Mar. 14, 1939 |
| 2,302,786 | McGee et al. | Nov. 24, 1942 |
| 2,394,196 | Morgan | Feb. 5, 1946 |
| 2,520,728 | Kline et al. | Aug. 29, 1950 |
| 2,603,775 | Chipp | July 15, 1952 |
| 2,615,367 | Murray | Oct. 28, 1952 |
| 2,615,935 | Doll | Oct. 28, 1952 |
| 2,640,866 | Powell | June 2, 1953 |
| 2,746,352 | Estey | May 22, 1956 |